June 19, 1951 A. ZILLGER 2,557,245

CONTROL APPARATUS FOR RADIO-PHONOGRAPH HAVING MAGNETIC AND DISK TYPE RECORDING SYSTEMS

Filed Feb. 12, 1948

Inventor:-
Arno Zillger
by Ralph T. Frunck
Attorney

Patented June 19, 1951 2,557,245

UNITED STATES PATENT OFFICE 2,557,245

CONTROL APPARATUS FOR RADIO-PHONOGRAPH HAVING MAGNETIC AND DISK TYPE RECORDING SYSTEMS

Arno Zillger, Merion, Pa., assignor to Molded Insulation Company, Philadelphia, Pa., a corporation of Pennsylvania Application February 12, 1948, Serial No. 7,891

3 Claims. (Cl. 179—100.11)

Figures 1, 2:
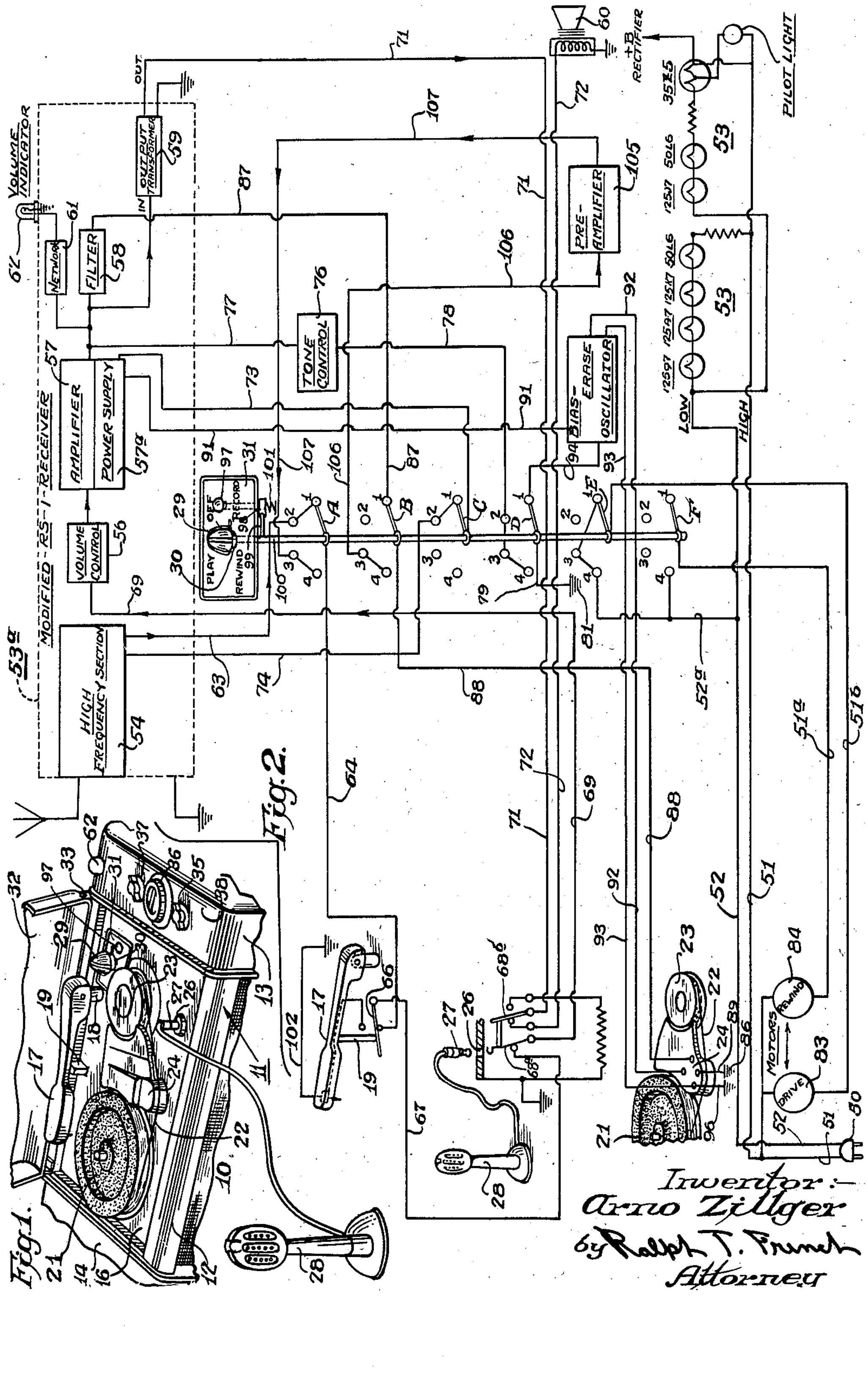

This invention relates to magnetic recording and reproducing apparatus, more particularly to such apparatus utilizing as the recording medium a thin flexible magnetizable member such as a filament, wire or tape adapted to be moved from one reel-like member to another during recording and reproducing operations, and has for an object novel control means for apparatus of this character.

In the interest of brevity, throughout the specification such apparatus will be referred to as "wire recorder" and such recording medium will be referred to as "wire," it being understood that other forms or recording medium, and other appropriate apparatus for operating the same, may be utilized without departing from the spirit of the invention.

The majority of wire recorders now available for home use are combined with radio receiving apparatus and phonograph mechanism, as well as with microphones. The wire recording unit, as distinguished from the radio receiving apparatus and the phonograph mechanism, usually has its own manual motor switch adjustable between four positions, generally indicated "Record," "Off," "Play" and "Rewind."

In order that the wire recorder may make a magnetic recording of a program received on the radio-receiving apparatus, played from a disc by the phonograph, or picked up by the microphone, or in order that the wire recorder may reproduce its recording through the radio loud speaker circuit, a second manual motor switch is usually provided having from four to six positions. These four to six positions of the second manual motor switch must be utilized in combination with the four positions of the wire recorder motor switch.

As result, there may be from sixteen to twenty-four combinations of manual switch settings from which the user (usually a layman) must select the correct setting for the operation or function desired. Inasmuch as the directions or instructions associated with the various switch positions are frequently brief to a degree rendering them indefinite, confusing, misleading or insufficient, much difficulty may well be encountered by the general public in attempting to operate such apparatus.

Accordingly, another object of the invention is wire recording, radio receiving and phonograph apparatus operable with only one manual motor switch.

Yet another object of the invention is radio-phonograph-wire recording combined apparatus incorporating novel control circuits effecting simplified manual control.

These and other objects are effected by the invention as will be apparent from the following description and claims, taken in accordance with the accompanying drawings, forming a part of this application, and in which:

Fig. 1 is a fragmentary perspective view of apparatus embodying the present invention; and, Fig. 2 is a diagrammatic view of one form of the novel control means of the present invention.

Referring now to the drawings in greater detail, the reference character 10 indicates, in its entirety, a combination radio, phonograph, wire recorder and microphone. This apparatus is shown as housed in a cabinet 11 including a central portion 12 and end portions 13 and 14.

The central portion 12 includes the usual resiliently-mounted horizontal panel 16 carrying the phonograph tone arm 17, supported by its pivotal mounting post 18 and the rest 19, the phonograph turntable 21 whose periphery is recessed circumferentially to function during wire recording and reproducing as a receiving or take-up reel for the wire 22, the wire supply reel 23, the combined erasing and recording and reproducing head 24 which may reciprocate vertically to function as a level winder for the wire on the reels, the jack 26 for the plug 27 of the microphone 28, and the control knob 29 for manual adjustment of the multi-blade motor switch 30. When the microphone is disconnected by removal of its plug 27 from the jack 26, the remaining parts just mentioned may be protected and concealed by closing the cover 32, which is hinged to the cabinet, as at 33.

The radio, which is generally the most used element of the combination, may be housed in the righthand end portion 13 of the cabinet 11, with its usual control knobs 35, 36 and 37 for on-off and volume, tuning, and tone, respectively, disposed on the upper wall 38 of the end portion 13. With this arrangement, the radio may be operated with the cover in closed position.

Referring now to Fig. 2, wherein several of the elements mentioned above in connection with Fig. 1 are illustrated diagrammatically, the multi-blade motor switch 30 controls recording and reproducing operations of the apparatus by means of the circuits shown and hereinafter described.

The motor switch 30 is provided with six contact arms A, B, C, D, E and F, which are moved as a unit to one of four different contact positions, these four positions being identified on an indicator plate 31 as "Record," "Off," "Play" and "Rewind," reading counterclockwise or from right to left as the plate 31 is viewed in Fig. 2. The four contacts with which each contact arm selectively engages are indicated by the numerals 1, 2, 3 and 4, corresponding to the four positions "Record," "Off," "Play" and Rewind," respectively.

At the lower left of Fig. 2 is shown the usual plug 50 for connection with a standard A. C. house circuit, current being supplied therefrom through the wires 51 and 52 to the conventional radio-receiving set circuit, shown diagrammatically at the lower right of Fig. 2, and indicated in its entirety by the reference character 53. In order to simplify the disclosure, the main elements of this conventional radio receiving circuit are also indicated at the top of Fig. 2, by the dot-dash rectangle 53*a*, which includes a high frequency section 54, volume control 56, amplifier 57, power supply 57*a*, filter 58, output transformer 59, network 61 and its associated volume indicator lamp 62.

*Play radio*

With the plug 50 connected to a source of A. C., the apparatus may be used for radio reception by turning the volume control to "On" by means of the knob 35 (Fig. 1) and adjusting the high frequency section 54 through the tuning dial 36 (Fig. 1) to select the desired broadcasting station. Inasmuch as the wire-recording portion of the apparatus is not in use, the motor switch 30 will be in "Off" position with the six contact arms engaging their number 2 contacts.

With the contact arms at positions 2, contact arm A will establish a circuit from the high frequency section 54 to the volume control 56 via wire 63, contact arm A, wire 64, phonograph switch 66 (normally retained closed by pressure of the tone arm 17 on its rest 19), wire 67, normally closed microphone jack switch 68*a*, and wire 69.

It may be mentioned here that the normally closed microphone jack switch 68*b* maintains a circuit between the output transformer 59 and a loud speaker 60 via wires 71 and 72, which circuit is interrupted only when the microphone 28 is utilized for recording. When recording from the microphone, it appears desirable that the loud speaker be muted, since monitoring of one's own voice is seldom necessary, and the possibility is always present of feedback occurring in installations where the microphone and the loud speaker are used at the same time, and come close to each other.

Contact arm B engages a dummy contact in position 2, and hence performs no function. Contact arm C establishes a circuit through wires 73 and 74 for flow of plate voltage from the power supply 57*a* to the high frequency section 54. Contact arm D cooperates with wires 77, 78 and 79 to connect the tone control 76 (operated by knob 37, Fig. 1) with the standard radio circuits, and ground, at 81.

Contact arms E and F both engage dummy contacts when in position 2, and therefore do not affect normal operation of the radio receiver. The sole purpose of contact arm E is to control the drive motor 83 which rotates the turntable 21, and the only function of contact arm F is to similarly control the rewind motor 84, which rotates the storage reel 23.

*Play phonograph disc*

When it is desired to play the phonograph (without recording on wire) the motor switch 30 is turned to "Play," thereby moving the six contact arms to their position 3. Subsequent lifting of the tone arm 17 from its rest 19 opens switch 66 to break the high frequency section circuit, thus interrupting all circuits which would otherwise be established by contact arms A, B and C, in position 3.

Contact arm D still renders effective the tone control 76, inasmuch as contacts 2, 3 and 4 thereof are interconnected. Contact arm E now connects the drive motor 83, while contact arm F remains on a dummy contact.

*Record from radio*

To make a wire recording of a radio program, the motor switch 30 is turned to "Record," which places the contact arms in position 1, as shown in Fig. 2 of the drawings. In this position contact arm A connects the radio high frequency section 54 with the volume control 56, amplifier 57, output transformer 59 and speaker 60, as well as the network 61 and its volume indicator 62, all as previously described in connection with "Playing the radio." Contact arm B connects the filter 58 and the recording portion of head 24 with ground, at 86, through wires 77, 78 and 79. Contact arm C provides plate voltage to the radio high frequency section 54 from power supply 57*a*, as previously described.

Contact arm D disconnects the tone control (for better quality of recording under home recording conditions) and connects the bias-erase oscillator with the bias-erase coil in the head 24 and ground 81, through wires 91, 92, 93, 94, 96 and 79. The head 24 and wire 22 are so related that as the latter passes through the former during recording, each portion thereof first passes through the erase coil of the head and then through the record coil thereof, with the result that any previous recording on the wire is removed immediately prior to the making of the new recording.

It may be mentioned here that, in order to prevent accidental erasing of a recording by unintentional turning of the motor switch 30 to "Record" position, the switch is provided with a safety latch 97 having a dog 98 normally disposed in the path of an arm 99 on the selector switch shaft 100, to prevent movement of the switch to the "Record" position except while the safety latch 97 is held depressed against the pressure of coil spring 101.

Contact arm E connects the drive motor 83, while contact arm F engages a dummy contact.

*Record from phonograph disc*

For recording from a phonograph disc the phonograph tone arm 17 is lifted from its switch-controlling rest 19, which cuts out the radio high frequency section and connects the tone arm pickup, through wire 102, with the rest of the circuits, and the disc is placed on the turntable 21. The motor switch 30 is then moved to "Record," thereby establishing the circuits in "Recording from radio," with the exception mentioned above, resulting from lifting of the phonograph tone arm.

Prior to this adjustment of the motor switch to "Record," the latter should be in the "Off" position to avoid running wire through the head while the disc is being prepared for playing, which would produce a section of wire without any record thereon.

*Record from microphone*

Recording from the microphone 28 is equally automatic. The motor switch remains at, or is moved to, "Record," and the microphone plug 27 is inserted in the jack 26, thereby interrupting the radio high frequency section circuit (previously established by return of the phonograph tone arm to its rest 19, thereby closing the phonograph switch 66) at the switch 68*a*. The remainder of the circuits are unchanged, except that the loud speaker 60 is disconnected automatically by the opening of the switch 68*b* upon insertion of the microphone plug 27 into its jack 26. The microphone input passes to the volume control and associated apparatus through wire 69.

*Play wire recording*

For the reproduction or playing of a wire recording, the motor switch 39 is turned to "Play," thereby placing the contact arms in position 3. Contact arm A then cuts out the radio high frequency section 54 and cooperates with contact arm B to place the pre-amplifier 105 in the circuit from the reproducing portion of head 24 to the volume control 56 via wire 88, contact arm B, wire 106, the pre-amplifier 105, wire 107, contact arm A, and wires 64, 67 and 69. Contact arm C engages a dummy contact, while "Rewind" to "Off" or "Play" while the wire is being transferred to the storage reel 23, thereby maintaining the wire 22 sufficiently taut to prevent tangling thereof.

From the preceding description it will be apparent that there is provided a control system which is semi-automatic in that no selection of control or switch positions, other than one of the four standard positions of the motor switch 39, is required. All other control functions occur automatically, either through conventional adjustment of the motor switch 39 or through lifting of the tone arm 17 from its switch-controlling rest 19, or insertion of the microphone plug 27 in the microphone jack 26. In other words, the operator of the apparatus uses only four positions of a single manual switch to cover the entire range of functions of the apparatus, instead of using two manual switches involving sixteen to twenty-four combinations of positions to effect the same results.

To clarify and summarize the operation of the motor selector switch 39 in its four positions, the various functions of the six contact arms are set forth briefly in the table on the following page.

While the invention has been illustrated in but one form and arrangement, it will be apparent that it is not so limited, but is susceptible of various changes, arrangements and modifications, without departing from the spirit thereof.

| Contact Arm No. | Motor Switch Positions | | | |
|---|---|---|---|---|
| | Rewind | Play | Off | Record |
| A | Disconnects radio high frequency section. | Disconnects radio high frequency section. | Connects radio high frequency section with volume control, amplifier, output transformer and loud speaker. | Connects radio high frequency section with volume control, amplifier, output transformer and loud speaker. |
| B | Connects pre-amplifier | Connects pre-amplifier | Disconnects filter and head from volume control and amplifier. | Connects filter and head with volume control and amplifier. |
| C | Cuts out plate voltage to radio high frequency section. | Cuts out plate voltage to radio high frequency section. | Provides plate voltage from power supply to radio high frequency section. | Provides plate voltage from power supply to radio high frequency section. |
| D | Connects tone control. Cuts out bias-erase oscillator. | Connects tone control. Cuts out bias-erase oscillator. | Connects tone control. Cuts out bias-erase oscillator. | Disconnects tone control. Connects bias-erase oscillator. |
| E | Connects drive motor | Connects drive motor | Disconnects drive motor | Connects drive motor. |
| F | Connects rewind motor | Disconnects rewind motor. | Disconnects rewind motor | Disconnects rewind motor. |

| | |
|---|---|
| Lifting phonograph tone arm into play position. | Disconnects radio high frequency section and feeds output of tone arm pickup directly to volume control and remainder of circuit. (For use in Record and Play positions.) |
| Inserting microphone plug into jack. | Disconnects radio high frequency section and feeds output of microphone directly to volume control and remainder of circuit. (For use in Record position.) |

contact arm D maintains the tone control connected, contact arm E energizes the drive motor 83, and contact arm F, controlling the rewind motor 84, engages a dummy contact and hence is inoperative.

*Rewind wire on storage reel*

The final function of the novel control system is that of rewinding the wire onto the storage reel 23, after either recording thereon or reproducing therefrom. For this function, the motor switch is turned to "Rewind," which places the six contact arms in position 4, where arms A, B, C, D and E function as in position 3 (Play), inasmuch as contacts 3 and 4 are connected at arms A, B, D and E and contacts 3 and 4 of arm C are dummies. Only contact arm F changes its function, by energizing the rewind motor 84 through wires 51, 51*a* and 52*a*.

Preferably, the contact arm E continues to energize the drive motor 83 to provide a drag on the turntable 21 especially during switching from

What is claimed is:

1. In combination, a radio receiver including a high frequency section and an audio amplifier section; a phonograph including a tone arm and pick-up thereon movable to and from a rest position; switch means controlled by movement of the tone arm to and from its rest position; a microphone and connector means therefor; switch means controlled by said connector means; a wire recording and reproducing device; a four-position manual switch mechanism; means controlled by said switch mechanism in one position to interconnect only the elements of said radio receiver so as to render the receiver operative; means controlled by said switch mechanism in a second position to connect the receiver output to said device for recording; means controlled by the first-mentioned switch means, upon movement of the tone arm from rest position while said switch mechanism is in its second position, to disconnect the high frequency section of the radio receiver and to connect the phonograph pick-up to the input of the audio amplifier section; other means controlled by the second-mentioned switch means, upon connection of said microphone while said switch mechanism is in its second position, to disconnect the high frequency section of the radio receiver and to connect the microphone to the input of the audio amplifier section; means controlled by said switch mechanism in a third position to disconnect the high frequency section of the radio receiver and to connect said device to the input of said audio amplifier section for reproduction; means controlled by the first-mentioned switch means, upon movement of the tone arm from rest position while said switch mechanism is in its third position, to disconnect said device from the input of the audio amplifier section and to connect the phonograph pick-up to the input of the audio amplifier section; and means controlled by said switch mechanism in its fourth position to effect rewinding operation of said device.

2. In combination, a radio receiver including a high frequency section and an audio amplifier section; a phonograph including a tone arm and a pick-up thereon movable to and from a rest position; switch means controlled by movement of the tone arm to and from its rest position; a wire recording and reproducing device; a four-position manual switch mechanism; means controlled by said switch mechanism in one position to interconnect only the elements of said radio receiver so as to render the receiver operative, means controlled by said switch mechanism in a second position to connect the receiver output to said device for recording; means controlled by the switch means, upon movement of the tone arm from rest position while said switch mechanism is in its second position, to disconnect the high frequency section of the radio receiver and to connect the phonograph pick-up to the input of the audio amplifier section; means controlled by said switch mechanism in a third position to disconnect the high frequency section of the radio receiver and to connect said device to the input of said audio amplifier section for reproduction; means controlled by the switch means, upon movement of the tone arm from rest position while said switch mechanism is in its third position, to disconnect said device from the input of the audio amplifier section and to connect the phonograph pick-up to the input of the audio amplifier section; and means controlled by said switch mechanism in its fourth position to effect rewinding operation of said device.

3. In combination, a radio receiver including a high frequency section and an audio amplifier section; a microphone and connector means therefor; switch means controlled by said connector means; a wire recording and reproducing device; a four-position manual switch mechanism; means controlled by said switch mechanism in one position to interconnect only the elements of said radio receiver so as to render the receiver operative; means controlled by said switch mechanism in a second position to connect the receiver output to said device for recording; means controlled by the switch means, upon connection of the microphone while said switch mechanism is in its second position, to disconnect the high frequency section of the radio receiver and to connect the mirophone to the input of the audio amplifier section; means controlled by said switch mechanism in a third position to disconnect the high frequency section of the radio receiver and to connect said device to the input of said audio amplifier section for reproduction; and means controlled by said switch mechanism in its fourth position to effect rewinding operation of said device.

ARNO ZILLGER.

REFERENCES CITED

The following references are of record in the file of this patent:

UNITED STATES PATENTS

| Number | Name | Date |
|---|---|---|
| 1,821,496 | Cohen | Sept. 1, 1931 |
| 1,912,140 | Hough | May 30, 1933 |
| 1,951,175 | Sinnett | Mar. 13, 1934 |
| 1,974,904 | Von Arco | Sept. 25, 1934 |
| 2,111,592 | Karns | Mar. 22, 1938 |